US 6,562,315 B2

(12) United States Patent
Korotkikh et al.

(10) Patent No.: US 6,562,315 B2
(45) Date of Patent: May 13, 2003

(54) SUPPRESSION OF METHANATION ACTIVITY BY A WATER GAS SHIFT REACTION CATALYST

(75) Inventors: Olga Korotkikh, Princeton, NJ (US); Wolfgang Friedrich Ruettinger, Plainsboro, NJ (US); Robert Joseph Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/283,855

(22) Filed: Oct. 30, 2002

(65) Prior Publication Data
US 2003/0064887 A1 Apr. 3, 2003

Related U.S. Application Data

(62) Division of application No. 09/670,218, filed on Sep. 25, 2000, now abandoned.

(51) Int. Cl.$^7$ ................................. C01B 3/16
(52) U.S. Cl. ................ 423/656; 423/655; 502/302; 502/304; 502/325; 502/326; 502/327; 502/329
(58) Field of Search ................ 423/655, 656; 502/304, 329

(56) References Cited

U.S. PATENT DOCUMENTS

| 3,922,337 A | 11/1975 | Campbell et al. ........ 423/656 |
| 3,939,220 A | 2/1976 | Rausch ................ 260/668 D |
| 4,088,607 A | * 5/1978 | Weidenbach et al. |
| 4,416,800 A | 11/1983 | Abe et al. ............. 502/159 |
| 4,497,902 A | 2/1985 | Bertolacini et al. ...... 502/65 |
| 4,518,708 A | 5/1985 | Krishnamurthy et al. ... 502/230 |
| 4,711,773 A | 12/1987 | Mesters et al. ......... 423/655 |
| 4,788,175 A | 11/1988 | Short et al. ........... 502/342 |
| 4,996,180 A | 2/1991 | Diwell et al. .......... 502/304 |
| 5,030,440 A | 7/1991 | Lywood et al. ......... 423/655 |
| 5,063,193 A | 11/1991 | Bedford et al. ......... 502/304 |
| 5,387,408 A | 2/1995 | Schneider et al. ....... 423/656 |
| 5,877,377 A | 3/1999 | Golunski et al. ........ 585/624 |
| 5,990,040 A | 11/1999 | Hu et al. .............. 502/342 |

FOREIGN PATENT DOCUMENTS

| EP | 0 361 648 A1 | 4/1990 | ........ C01B/3/48 |
| EP | 0 721 799 A1 | 7/1996 | ........ B01J/23/80 |
| WO | WO 00/66486 | 11/2000 | |

* cited by examiner

Primary Examiner—Wayne A Langel
(74) Attorney, Agent, or Firm—Russell G. Lindenfeldar

(57) ABSTRACT

The invention provides a process for carrying out the water gas shift reaction comprising employing a methane production suppressing water gas shift reaction catalyst, wherein the methane production suppressing water gas shift reaction catalyst comprises a methane production suppressing effective amount of a basic metal oxide.

16 Claims, 4 Drawing Sheets

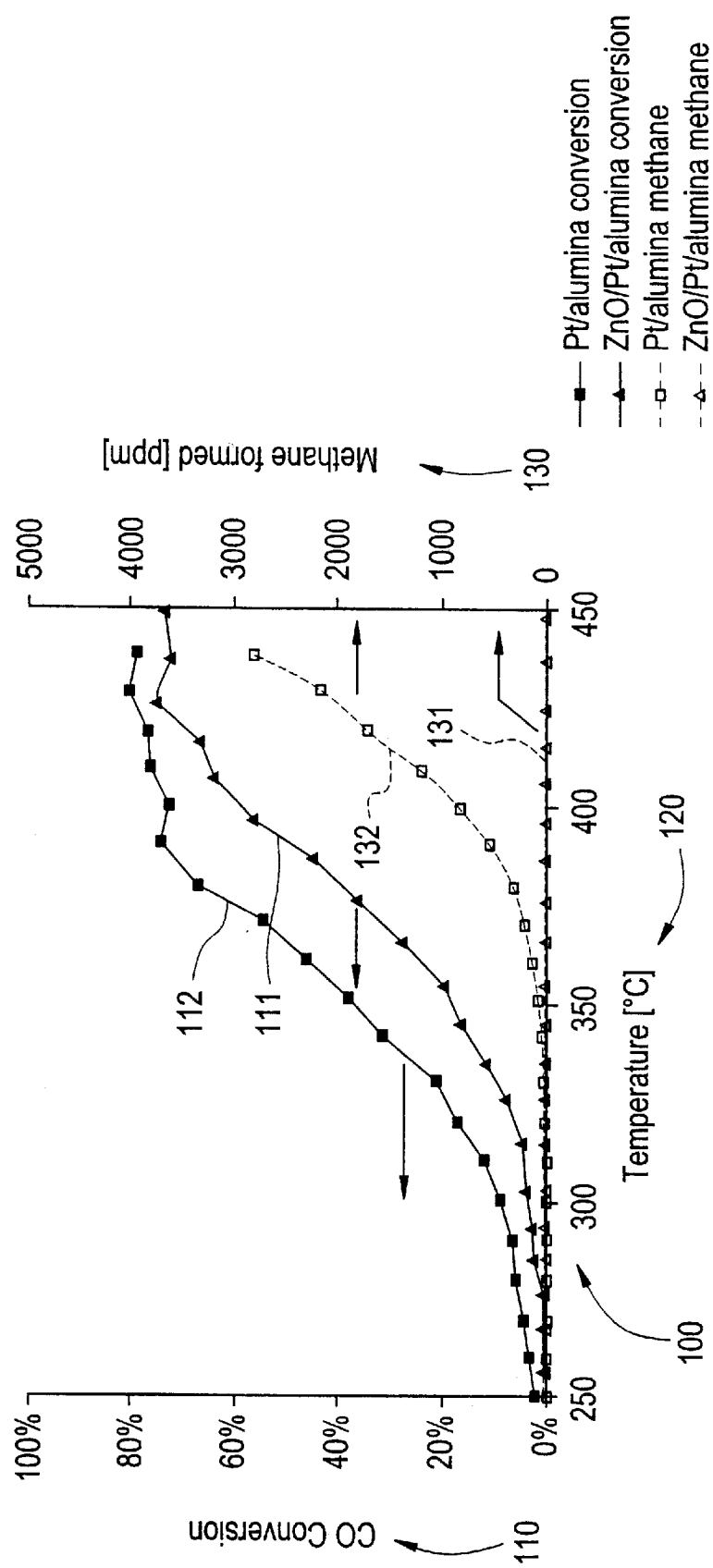

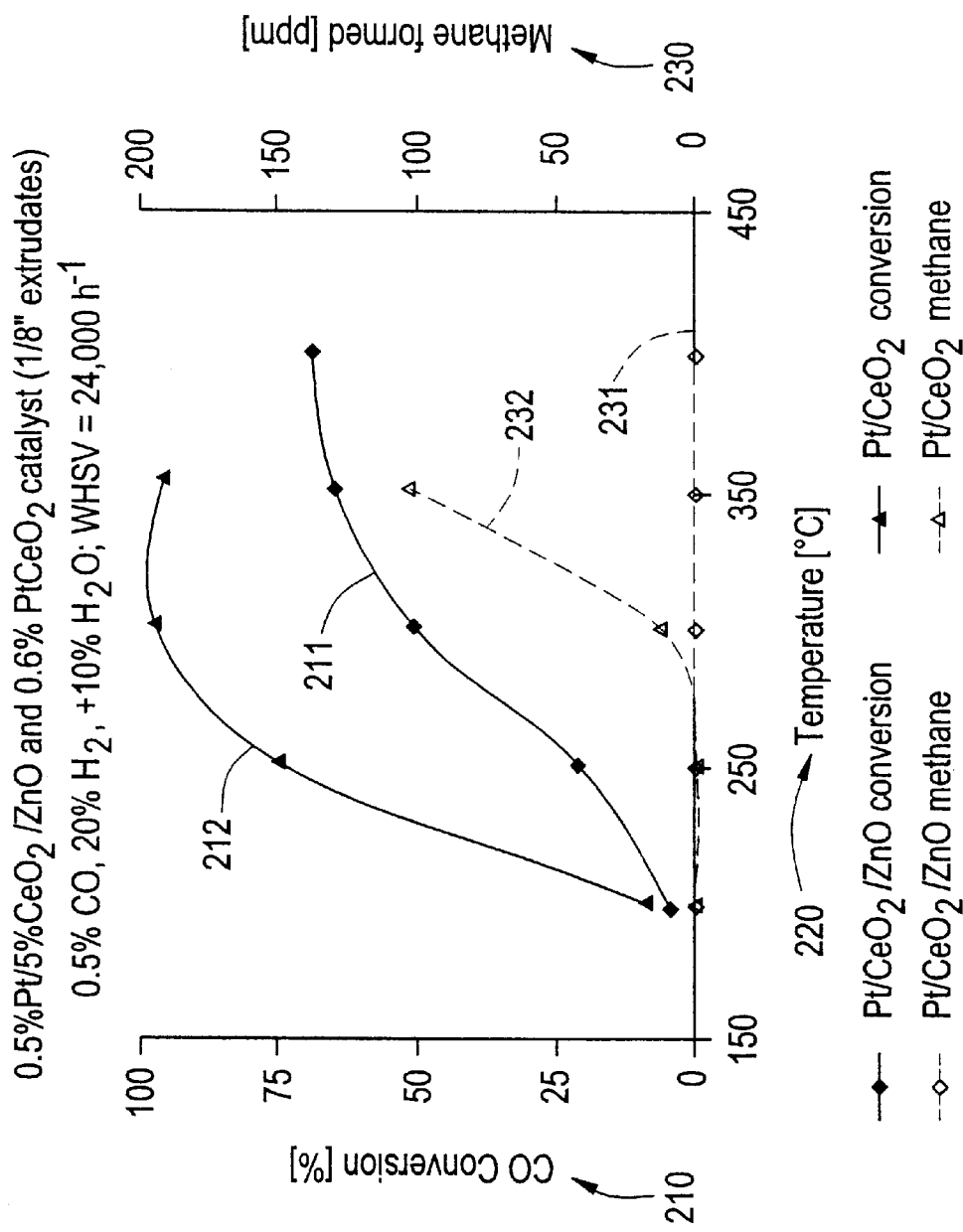

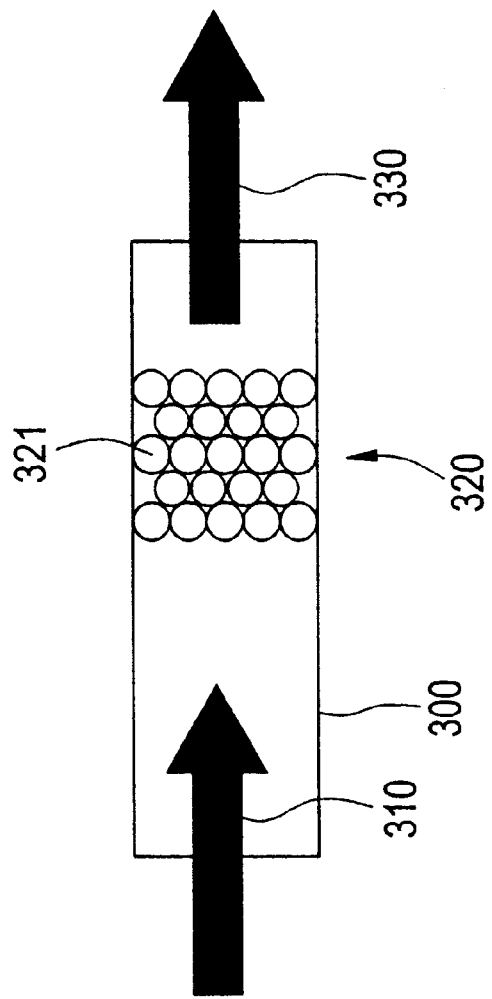

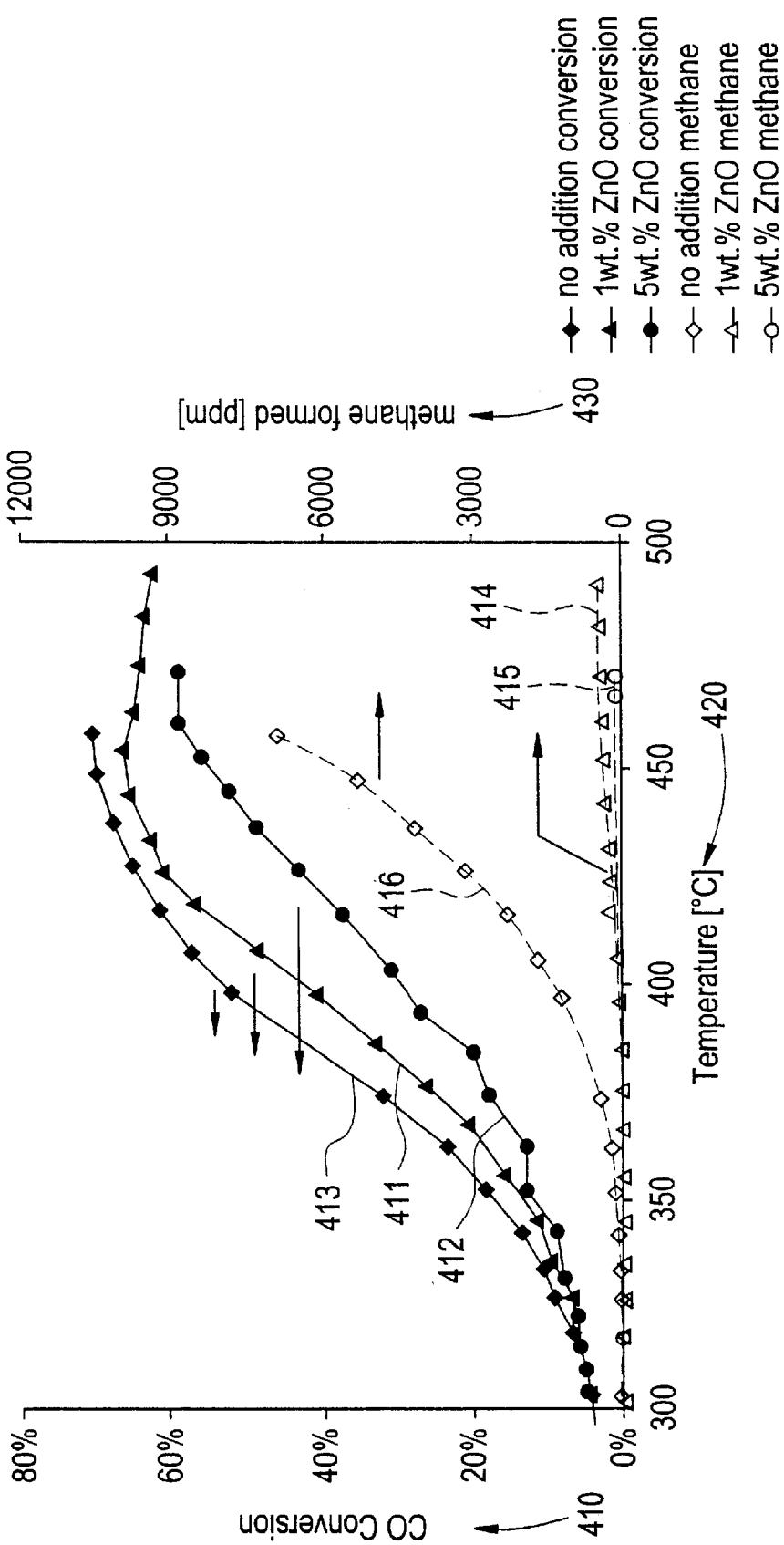

SUPPRESSION OF METHANATION ACTIVITY BY A WATER GAS SHIFT REACTION CATALYST

CROSS REFERENCE TO RELATED APPLICATION

This application is a divisional of U.S. application Ser. No. 09/670,218, filed Sep. 25, 2000, which is incorporated herein by reference, abandoned.

The present invention relates to improved water gas shift catalysts and methods of their use for lowering the undesirable methane formation that can accompany water gas shift reaction processes, and in particular to lowering methane production in high temperature water gas shift reaction processes in a gas stream comprising hydrogen, steam and carbon monoxide. The catalysts and methods of the invention are useful, for example, in inhibiting methane production in a water gas shift reaction used to produce a hydrogen gas stream supplied to a fuel cell, particularly to proton exchange membrane (PEM) fuel cells.

Fuel cells directly convert chemical energy into electricity thereby eliminating the mechanical process steps that limit thermodynamic efficiency, and have been proposed as a power source for many applications. The fuel cell can be 2 to 3 times as efficient as the internal combustion engine with little, if any, emission of primary pollutants such as carbon monoxide, hydrocarbons and nitric oxides. Fuel cell-powered vehicles which reform hydrocarbons to power the fuel cells generate less carbon dioxide. (green house gas) and have enhanced fuel efficiency.

Fuel cells, including PEM fuel cells [also called solid polymer electrolyte or (SPE) fuel cells], as known in the art, generate electrical power in a chemical reaction between a reducing agent (hydrogen) and an oxidizing agent (oxygen) which are fed to the fuel cells. A PEM fuel cell comprises an anode and a cathode separated by a membrane which is usually an ion exchange resin membrane. The anode and cathode electrodes are typically constructed from finely divided carbon particles and proton conductive resin intermingled with the catalytic and carbon particles. In typical PEM fuel cell operation, hydrogen gas is electrolytically oxidized to hydrogen ions at the anode composed of platinum catalytic particles deposited on a conductive carbon electrode. The protons pass through the ion exchange resin membrane, which can be a fluoropolymer of sulfonic acid called a proton exchange membrane. H$_2$O is produced when protons then combine with oxygen that has been electrolytically reduced at the cathode. The electrons flow through an external circuit in this process to do work, for example creating an electrical potential across the electrodes. Examples of membrane electrode assemblies and fuel cells are described in U.S. Pat. No. 5,272,017.

Fuel cells require both oxygen and a source of hydrogen to function. The oxygen can be readily obtained in pure form (i.e., O$_2$) or from the air. However, hydrogen gas is not present in sufficient quantities in the air for fuel cell applications. The low volumetric energy density of isolated hydrogen gas compared to conventional hydrocarbon fuels makes the direct supply of hydrogen gas to fuel cells impractical for most applications because a very large volume of hydrogen gas would be required to provide an equivalent amount of energy stored in a much smaller volume of conventional hydrocarbon fuels such as natural gas, alcohol, oil or gasoline. Accordingly, the conversion of known hydrocarbon based fuel stocks to hydrogen gas is an attractive source of hydrogen for fuel cells and other applications.

Removal of impurities such as sulfur from the starting materials and lowering the concentration of oxidative products generated in the conversion process, such carbon monoxide, are major challenges in hydrogen production. Fuel cells are generally incapacitated by the presence of even low concentrations of CO, which poisons that catalyst at the anode. Despite development of more CO-tolerant Pt/Ru anodes, fuel cells are still susceptible to compromised function, for example when used with hydrogen sources with a CO concentration above 5 ppm.

The production of hydrogen gas from natural hydrocarbon sources is widely practiced in the chemical industry, for example in the production of ammonia and alcohol. A variety of reaction steps employing different carefully designed catalysts are used in the industrial production of hydrogen. A series of several reaction steps is typically required to reduce CO concentrations to below required levels, for example below 5 ppm. Many of these reaction steps require high pressures (for example, in excess of 1,000 psig), high reaction temperatures (for example, in excess of 800 deg. C.) and use self-heating pyrophoric catalysts. The scale and weight of machinery required to safely carry out such processes is too large for many fuel cell applications, such as automobile or residential applications. Furthermore, while the hazards presented by such reaction conditions can be effectively managed in an industrial production setting, similar hazards present unacceptable levels of risk for most fuel cell applications.

The water gas shift (WGS) reaction is a well known catalytic reaction which is used, among other things, to generate hydrogen by chemical reaction of CO with water vapor (H$_2$O) according to the following stoichiometry:

$$CO+H_2O \rightarrow CO_2+H_2$$

wherein the reaction requires a catalyst. Typical catalysts employed in this reaction are based on combinations of iron oxide with chromia at high temperatures (about 350 deg. C.) or mixtures of copper and zinc materials at lower temperatures (about 200 deg. C.).

When used at temperatures above about 300 degrees C., water gas shift reaction catalysts also cause the formation of methane (CH$_4$) by catalyzing the reaction of CO or CO$_2$ with hydrogen according to the reaction stoichiometries:

$$CO+3\ H_2 \rightarrow CH_4+H_2O$$

$$CO_2+4\ H_2 \rightarrow CH_4+2\ H_2O$$

The production of methane during the water gas shift reaction, also known as "methanation", is a side reaction that consumes hydrogen gas in an exothermic reaction. Thus, for applications where the water gas shift reaction is used to produce hydrogen gas and reduce CO concentration, the methanation reaction is a major disadvantage related primarily to precious metal containing water gas shift reaction catalysts. Methanation can reduce the hydrogen yield from the water gas shift reaction by consuming hydrogen to form methane, and increase the temperature of the catalyst thereby lowering the efficiency hydrogen production.

What is needed is a water gas shift reaction catalyst that inhibits or eliminates the methanation side reaction, that can be integrated with existing catalytic systems without significantly reducing the activity of commercially available catalysts and without significantly increasing the cost of catalyst synthesis and production. The present invention overcomes these deficiencies in the prior art by providing an improved precious metal water-gas shift reaction catalyst and methods for the use thereof.

SUMMARY OF THE INVENTION

In one embodiment, the invention relates to a process for carrying out the water gas shift reaction employing a methane production suppressing water gas shift reaction catalyst. The methane production suppressing water gas shift reaction catalyst comprises a methane production suppressing effective amount of a basic metal oxide. The basic metal oxide can be one or more of MgO, CaO, SrO, BaO, or ZnO. In one preferred embodiment of the process the basic metal oxide is zinc oxide calculated as ZnO.

In another embodiment the process employs a methane production suppressing water gas shift reaction catalyst that also has a support and a catalytic agent. In one embodiment the support is activated alumina. Preferably, the support has a BET effective surface area of at least 10 $m^2/g$. In one preferred embodiment, the process employs a methane production suppressing water gas shift reaction catalyst that also has a promoter. The promoter can be one or more of $CeO_2$, $Nd_2O_3$, $Pr_2O_3$, $TiO_2$, $Fe_2O_3$, NiO, $MnO_2$, or $Co_2O_3$. Preferably, the promoter is ceria calculated as $CeO_2$.

In another preferred embodiment, the catalytic agent has one or more of Rh, Pd, or Pt.

In one aspect of the invention the process also employs a monolith, wherein the methane production suppressing water gas shift reaction catalyst is deposited on the monolith as a washcoat composition. In one preferred embodiment the basic metal oxide is ZnO. In another preferred embodiment the catalytic agent is Pt. In another preferred embodiment the support is alumina. In another preferred embodiment the catalytic agent is Pt and the support is alumina.

In another aspect of the invention the process also has the steps of: providing an input gas stream; contacting the input gas stream with the methane production suppressing water gas shift reaction catalyst; and catalyzing the water gas shift reaction with the methane production suppressing water gas shift reaction catalyst.

In one embodiment of this process, the methane production suppressing water gas shift reaction catalyst has: (i) alumina support particles; (ii) zinc oxide calculated as ZnO; and (iii) Pt. The input gas stream includes: (i) between about 1% by volume and about 10% by volume CO, (ii) at least 30% by volume hydrogen, and (iii) at least 15% by volume $H_2O$. The input gas stream is characterized by a space velocity greater than 500 $hr^{-1}$ particle VHSV.

In another embodiment of the process, the methane production suppressing water gas shift reaction catalyst has: (i) a zinc oxide support particles calculated as ZnO, (ii) ceria calculated as $CeO_2$ and (iii) Pt. The input gas stream includes: (i) between about 1% by volume and about 10% by volume CO, (ii) at least 30% by volume hydrogen, and (iii) at least 15% by volume $H_2O$. The input gas stream is characterized by a space velocity greater than about 500 $hr^{-1}$ particle VHSV.

In another embodiment of the process, the methane production suppressing water gas shift reaction catalyst has: (i) an alumina support, (ii) zinc oxide calculated as ZnO and (iii) Pt. The methane production suppressing water gas shift catalyst is in the form of a washcoat composition deposited on a monolith. The input gas stream includes: (i) between about 1% by volume and about 10% by volume CO, (ii) at least 30% by volume hydrogen, and (iii) at least 15% by volume $H_2O$. The input gas stream is characterized by a space velocity greater than 2,000 $hr^{-1}$ monolith VHSV.

In another aspect, the invention relates to a methane production suppressing water gas shift reaction catalyst having a methane production suppressing effective amount of a basic metal oxide and a catalytically effective amount of a catalytic agent. The catalytic agent is one or more of Rh, Pd, or Pt. In one preferred embodiment the basic metal oxide of the methane production suppressing water gas shift reaction catalyst is zinc oxide calculated as ZnO. In another preferred embodiment, the catalytic agent is Pt.

In another aspect, the methane production suppressing water gas shift reaction catalyst has: an alumina support impregnated with: (i) a catalytically effective amount of a catalytic agent and (ii) a basic metal oxide. The catalytic agent is one or more of Rh, Pd, or Pt. In one preferred embodiment the basic metal oxide of the methane production suppressing water gas shift reaction catalyst is zinc oxide calculated as ZnO. In another preferred embodiment, the methane production suppressing water gas shift reaction catalyst is in the form of a washcoat composition deposited on a monolith. In another preferred embodiment, the catalytic agent of the methane production suppressing water gas shift reaction catalyst is Pt.

In another aspect, the methane production suppressing water gas shift reaction catalyst has a support combined with a catalytically effective amount of a catalytic agent The support consists essentially of zinc oxide calculated as ZnO. The catalytic agent is selected from one or more of Rh, Pd, or Pt. In one preferred embodiment, the support of the methane production suppressing water gas shift reaction catalyst is further combined with a promoter. Preferably this promoter is ceria calculated as $CeO_2$, and the catalytic agent is Pt.

BRIEF DESCRIPTION OF THE DRAWINGS

FIG. 1 is a graphic comparison of catalytic performance of methane suppressing water gas shift (WGS) reaction catalysts of the invention and methane producing WGS catalysts, as measured by CO conversion percentage and amount of methane production.

FIG. 2 is a graphic representation of catalytic performance of methane suppressing WGS reaction catalysts of the invention and of methane-producing WGS reaction catalysts as measured by CO conversion percentage and amount of methane production.

FIG. 3 is a schematic configuration diagram of some embodiments of the invention.

FIG. 4 is a graphic representation of catalytic performance of methane suppressing WGS reaction catalysts, in the form of washcoat compositions deposited on monoliths, as measured by CO conversion percentage and amount of methane production.

DETAILED DESCRIPTION OF THE INVENTION

Definitions

The definitions of certain terms used herein are as follows:

"activated alumina" means a high BET surface area alumina, for example greater than 10 $m^2/g$, having primarily one or more of gamma, theta and delta aluminas.

"bead" means a type of particle that is substantially spherical, preferably with a diameter of at least about 1 mm.

"BET surface area" means the Brunauer, Emmett, Teller method for determining surface area by $N_2$ adsorption. Unless otherwise specifically stated, all references herein to the surface area refer to the BET surface area.

"catalytically effective amount" means that the amount of material present is sufficient to affect the rate of reaction of the water gas shift reaction in the sample being treated.

"combination" or "combined" when used with reference to a combination of catalyst components means combinations attained by mixtures, impregnation, extrudates or blends of catalyst components, superimposed discrete layers of components or other suitable methods known in the art which can be used to synthesize a catalyst, for example by incorporation of a catalytic agent, one or more metals or metal oxides, and the like on top of or into a support.

"incipient wetness impregnation" means the impregnation of the catalyst support with a volume of metal salt solution substantially equal to the pore volume of the support material.

"inlet temperature" shall mean the temperature of the hydrogen stream, test gas, fluid sample or fluid stream being treated immediately prior to initial contact of the hydrogen stream, carbon monoxide, water, test gas, fluid sample or fluid stream with a catalyst composition.

"methane production suppressing effective amount" means at least an amount sufficient to suppress the rate of methane production while carrying out a water gas shift reaction.

"monolith" is any unibody structure upon which a washcoat is deposited. Monoliths include ceramic monoliths, foam monoliths, and heat exchangers.

"particle" is used without restriction as to shape, composition, or internal structure, to mean a separable or distinct unit of material that can characterized by physical measurements such as weight, dimension, position and the like; e.g., a support particle, an extrudeate, a fragment or a grain. Particles can include nanoparticles, microparticles, and larger discrete pieces of material.

"particle diameter" or "bead diameter" means the length of a straight line through the center of a particle or bead considered as a sphere; used as an expression of particle size.

"percent by volume", "volume percent" or "% v", when used to refer to the amount of a particular gas component of a gas stream, unless otherwise indicated, means the mole percent of the gas component of the gas stream as expressed as a percent volume.

"percent by weight", or "weight percent" or "% wt.", unless otherwise indicated, means weight percent based on the weight of an analyte as a percentage of the total catalyst weight, including the support and any catalytic material impregnated therein, including without limitation the catalytic agent and any metal oxide material.

"product" means a gas or fluid sample, for example a gas stream, such as a hydrogen stream, test gas, fluid sample or fluid stream, after passing through a catalytic region or after having completed all contact with a catalyst composition.

"reactant", "reactant stream" or "input stream" means a gas or fluid sample, which can be a gas stream, such as a hydrogen stream, a static gas sample, a test gas, fluid sample or fluid stream, prior to passing through a catalytic region or prior to initial contact with a catalyst composition.

T(50) means the temperature to achieve 50% conversion of reactant using the catalyst under the specified conditions. T(50) is recognized as a measure of the activity of a catalyst: the lower the T(50), the higher the activity of the catalyst. Unless otherwise specified, T(50) is measured at standard temperature and pressure.

particle VHSV means volume hourly space velocity; that is, the flow of a reactant gas in liter per hour per liter of catalyst volume at standard temperature and pressure.

monolith VHSV means volume hourly space velocity; that is, the flow of a reactant gas in liter per hour per liter of total volume of the monolith at standard temperature and pressure.

"washcoat" refers to the catalytic composition of a support, basic metal oxide, promoter, and a catalytic agent which is deposited on the walls of the monolith.

WHSV means weight hourly space velocity; that is, the flow of a reactant gas in liter per hour per kilogram of catalyst at standard temperature and pressure.

The present invention provides an improved water gas shift reaction catalyst and methods for the use thereof, for example, in generating hydrogen while minimizing the production of methane. In some preferred embodiments, the invention provides water gas shift reaction catalysts and methods for their use which significantly reduce the production of methane, particularly at reaction temperatures above about 300 degrees C.

One feature of the present invention resides in catalysts and methods for reducing the production of methane ($CH_4$) in a water gas shift reaction. The water gas shift reaction may be used, for example, for increasing hydrogen in a gas stream to a desired minimum level. The invention is useful, for example, for minimizing methane production while lowering levels of CO and increasing levels of hydrogen with the water gas shift reaction. One desirable application of the invention is in providing higher hydrogen concentration from hydrocarbon fuels to a fuel cell. In some embodiments, the catalysts of the invention can be used as an intermediate step in a series of chemical processes to generate hydrogen from a gas borne stream by using the water gas shift reaction. The catalysts of the present invention have utility for many other uses where hydrogen generation with minimal methane production is desired, including hydrogen gas generation, uses with alcohol or ammonia synthesis, Fischer Tropsch synthesis, and the like. For example, the catalysts and methods of the invention can be used to replace conventional high temperature iron-chromium based water gas shift (WGS) reaction, catalysts such as $Fe_2O_3/Cr_2O_3$ that typically operate at about 350 degrees C.

The catalysts of the present invention comprise a basic metal oxide, a support and a catalytic agent. The catalysts of the invention can also optionally comprise a promoter material (i.e., a "promoter"). It has been found, surprisingly, that adding a basic metal oxide to a precious metal water gas shift reaction catalyst can dramatically reduce or eliminate the production of methane in the WGS reaction. In some embodiments, a catalytic support (or "a support") can be impregnated with a suitable basic metal oxide and a suitable catalytic agent to achieve the desired effect of the inhibition of methane production during the water gas shift reaction. In other embodiments, the suitable basic metal oxide can itself form a catalyst support which is combined with a suitable catalytic agent to achieve the desired effect of the inhibition of methane production during the water gas shift reaction. Thus, in some embodiments, the catalyst comprises (i) a support combined with both (ii) a methane-production-suppressing-effective amount of a basic metal oxide and (iii)

a catalytically-effective amount of a catalytic agent. In some embodiments, the catalyst comprises (i) a methane-production-suppressing basic metal oxide support that is combined with (ii) a catalytically-effective amount of a catalytic agent.

The support used in the catalyst of the invention should be relatively unreactive with the promoter, catalytic agent or a basic metal oxide incorporated therein. The preferred support materials have high surface area. Examples of supports are silica, ceria, zeolites, zirconia, titania, zinc oxide, alumina, or combinations thereof. Alumina and zinc oxide are particularly preferred supports. The support can take any suitable form such as a particle, pellet, extrudate, tablet and the like. The support may also be part of a washcoat composition for deposition on a monolith structure. A number of commercially available supports that are suitable for preparing catalysts of the invention and practicing the methods of the invention are readily available. For example, Alcoa Alumina DD-443 (327 $m^2/g$ BET surface area before calcination ⅛-inch diameter), beads can be used to practice the invention. Desirable characteristics for preferred supports include being readily available, affordable and able to be impregnated to high loadings of catalytic agents, promoters, metals, metal oxides and the like. Enhanced catalytic activity is favored by using a high surface area supports, for example with a BET surface area of at least 10 $m^2/g$ and preferably at least 200 $m^2/g$.

The basic metal oxide is a methane-production suppressing basic metal oxide, preferably zinc oxide, calculated as ZnO. Other suitable basic metal oxides include MgO, CaO, SrO and BaO and the like, as well as combinations thereof or combinations with other metal oxides. In some preferred embodiments, for instance, an alumina support is impregnated with ZnO. Preferably, the methane-production-suppressing-effective amount of a basic metal oxide limits the production of methane in a WGS reaction process to below 20% of the methane production level of a process using a similar catalyst, wherein the catalytic agent and support are the same, but that does not contain the basic metal oxide. The amount of basic metal oxide in the catalyst of the invention is in a physical form that is effective to provide the desired suppression of methane production.

In those embodiments wherein the basic metal oxide also forms the support, the methane-production-suppressing-effective amount of basic metal oxide present preferably limits the production of methane to below 200 ppm at a temperature of at least 350 degrees C.

The catalytic agent can be any suitable material that catalyzes the water gas shift reaction, including but not limited to those currently recognized in the art (i.e., water gas shift reaction catalysts). Examples of suitable catalytic agents include Fe, Mn, Co, Ni, Mo, V, Pd, Rh, Pt and oxides of these metals as well as combinations thereof and oxides thereof. Preferred catalytic agents include precious metals. Precious metals include Pt, Pd, and Rh and oxides of these metals as well as combinations thereof and oxides thereof. A particularly preferred catalytic agent is Pt. As understood in the art, some metal catalytic agents may exist in the catalyst in different oxidation states, for example as metal oxides, metal clusters, combinations thereof and the like.

In some embodiments, a promoter can also be combined with the support or the catalytic agent. Suitable promoters include, for example, $CeO_2$, $Nd_2O_3$, $Pr_2O_3$, $TiO_2$, $Fe_2O_3$, NiO, $MnO_2$, $Co_2O_3$ as well as combinations thereof. Preferably, the promoter is incorporated into the support prior to addition of the catalytic agent. A preferred promoter is ceria. A promoter such as ceria can be included in the catalysts of the invention, including (i) embodiments where the support is a methane production suppressing basic metal oxide and (ii) embodiments where a suitable support is impregnated with a methane production suppressing basic metal oxide. For example, ceria, as calculated as $Ce_xO_y$ (wherein x is 1, 2 or between 1 and 2 and y is 2, 3 or between 2 and 3) can be combined with a basic metal oxide support and a WGS reaction catalytic agent to form a methane production suppressing WGS reaction catalyst. For example, in some preferred embodiments, a ceria promoter, preferably calculated as $CeO_2$, and a Pt catalytic agent are impregnated in a ZnO support.

Generally, other ingredients may be added to the catalyst composition of the present invention such as conventional thermal stabilizers for the alumina, e.g., the oxides of lanthanum, barium, silicon, and strontium. Thermal stabilization of high surface area ceria and alumina to militate against phase conversion to less catalytically effective low surface area forms is well-known in the art. Such thermal stabilizers may be incorporated into the bulk ceria or into the bulk activated alumina, by impregnating the alumina particles with, e.g., a solution of a soluble compound of the stabilizer metal. Such impregnation is then followed by drying and calcining the impregnated particles.

In some embodiments, a methane-production-suppressing basic metal oxide material is used as a support for the preparation of a methane-suppressing water gas shift reaction catalyst. The basic metal oxide support can be combined with a catalytically effective amount of a suitable catalytic agent (e.g., such as a metal catalytic agent and a ZnO basic metal oxide to form a "metal/ZnO" catalyst) and, in some embodiments, with a suitable promoter (e.g., ceria to form a "metal/ceria/ZnO" catalyst). The catalytic agent can be added, for example by impregnation, before or after addition of a promoter to the support. Addition of the catalytic agent can be accomplished using any suitable method known in the art. For example, in some embodiments, a catalyst made from a ZnO support combined with a ceria promoter and a Pt catalytic agent can be used to practice the methods of the invention.

In some embodiments, a methane-production-suppression-effective amount of a suitable basic metal oxide is incorporated into a pre-formed particle of the support, such as alumina, prior to impregnation of the support with the catalytic agent. Alternatively, the basic metal oxide can be incorporated in the support by impregnation of a formed support particle using a precursor salt of the basic metal oxide (rather than as basic metal oxide itself) followed by calcination. In some embodiments, incipient wetness impregnation can be used to impregnate alumina particles. For example, Pt impregnated alumina support particles can be prepared by incipient wetness impregnation of alumina particles. In some embodiments, impregnation of alumina particles with a Pt-nitrate solution is followed by drying and calcination to prepare catalytic agent/support particles (e.g., Pt/alumina). The catalytic agent/support particles are then dried and calcined prior to impregnation with a methane-production-suppressing reducible metal oxide to form catalytic agent/basic metal oxide/support particles (e.g., to form Pt/ZnO/alumina particles). For example, Pt/alumina particles can be first dried at ambient temperature, then dried at about 120 degrees C., then calcined at 500° C. in air. Next, the calcined particles are impregnated in an aqueous solution of zinc nitrate. The beads are then dried and calcined again to prepare a WGS reaction catalyst of the invention (i.e., to form catalytic agent/basic metal oxide/support particles such as Pt/ZnO/alumina beads). In an alternative preparation of the WGS reaction catalyst of the invention, impregnation of the support with a basic metal oxide can be accomplished before impregnation by the catalytic agent.

An alternative embodiment of the invention provides for the reaction catalyst of the invention to be used on a monolith. Useful monoliths for the invention include any monolith that can be prepared by depositing a washcoat composition containing a methane-production suppressing water gas shift reaction catalyst, and can include, for example, ceramic monoliths, foams and heat exchangers. The preparation of the water gas shift reaction catalyst of the invention used in the invention on a monolith can include the steps, for instance, of impregnating alumina powder using a salt of a catalytic metal (for example, a nitrate salt) and with a salt of basic metal oxide, for example, zinc nitrate, drying and calcining the powder. The alumina can optionally be further impregnated with a promoter, for example, ceria. A slurry (or washcoat composition) can then be prepared by suspending the resulting powder in water. The slurry can then be pulverized by, for example, a ball-mill. The monolith can be washcoated with this slurry by, for example, dipping the monolith in the slurry or meter charged coating of the monolith. The monolith can be dried and calcined. Other methods known to those in the art can also be used for washcoating the monolith. In a particularly preferred embodiment of the method, the washcoat composition for the monolith includes a precious metal catalytic agent such as Pt, with ZnO as the basic metal oxide and alumina as the support.

According to the present invention, carbon monoxide is reacted with steam to produce hydrogen and carbon dioxide. The reactant stream can be received from the products of other reactions which produce compounds besides water and hydrogen, such as CO or $CO_2$ from gas reforming reactions used to oxidize hydrocarbons. The reactant stream of carbon monoxide can be admixed with hydrogen, carbon dioxide, steam or nitrogen, as well as minor amounts of olefins, alcohols, aldehydes and/or other hydrocarbons. Preferably, the reactant stream comprises not more than 4–5% v hydrocarbons, not more than 10% v CO by volume and not more than 25% $CO_2$ by volume. The carbon monoxide-containing reaction stream should preferably not contain amounts of sulfur or halogens such as chlorine, which can poison and deactivate the catalysts of the invention. Preferably, the levels of sulfur and chlorine in the reactant stream are kept to below 1 ppm in the portion of the reactant that contacts the catalyst.

Using the catalysts and methods of the invention, CO concentrations as low as about 1,000 ppm or lower can be attained. Methane concentrations in the product are typically also significantly reduced compared to catalysts that do not incorporate the methane-production-suppressing basic metal oxide. In preferred embodiments, the methane concentration in the product is below the detection limit of about 5 ppm. Parameters that can be varied to optimize the water gas shift (WGS) reaction, as understood in the art, can include but are not limited to the composition and space velocity of the reactant stream, inlet temperature, composition of the catalyst, and the temperature of the catalyst. Water gas shift reaction catalysts has been extensively studied. For example, Jacques Barbier and Daniel Duprez, Applied Catalysis B: Environmental 4 (1994) 105–140; "Steam effects in three way catalysts" reviews the water gas shift reaction using a variety of catalytic systems, including systems comprising an alumina support, a ceria promoter and a variety of catalytic metals such as platinum, rhodium, and palladium. Accordingly, it is understood in the art from this reference and others that thermodynamic and kinetic considerations dictate the desirability of operating the water gas shift reaction at temperatures as close to a certain threshold temperature as possible to maximize the conversion of CO to $CO_2$. The catalysts and methods of the invention inhibit the exothermic production of methane during the water gas shift reaction and accordingly can allow for lower reaction temperatures and possibly for higher levels of hydrogen produced.

In preferred embodiments, the catalysts and methods of the invention are suited for use with a gaseous reactant stream, for example a hydrogen-containing gas stream containing CO, hydrogen and steam ($H_2O$), at a pressure of at least 1 atmosphere and CO up to 10% by volume. Typically, molar excesses of steam are used relative to the amount of carbon monoxide in the reaction stream. Generally, $H_2O$:CO molar ratios of between 1:1 (i.e., "1.0") and 20:1 (i.e. "20.0") are preferred in a gas reactant stream before contact with the catalyst, with higher ratios being particularly preferred. Reactant stream temperatures of between about 300 degrees C. and 600 degrees C. are preferred. As noted above, one skilled in the art would recognize that lower reaction temperatures favor lower equilibrium CO levels, that adding more steam increases the amount of CO conversion at a given temperature, and similar considerations. Accordingly, one of skill in the art would be able to balance theoretical considerations pertaining to reaction design with practical considerations relevant to a particular application so as to optimize parameters to achieve the best possible desired result. For monoliths, gaseous hourly space velocities of at least 2,000 to about 50,000 $hr^{-1}$ monolith VHSV measured on the basis of dry gas under standard conditions are suitable for most fuel cell operations. For particles, gaseous hourly space velocities of at least 500 to about 10,000 $hr^{-1}$ particle VHSV measured on the basis of dry gas under standard conditions are suitable. However, any suitable gaseous hourly space velocities, as recognized in the art, may be employed.

Particularly preferred catalysts of the invention selectively convert carbon monoxide and water to hydrogen and carbon dioxide, wherein the CO is present in a reaction gas stream, for example, at concentrations of up to 10% CO. Typical reaction gas streams can also comprise about 30 to 70% by volume hydrogen and at least 15% by volume water vapor. Typical output CO concentrations can be, for example, about 0.5% by volume (5,000 ppm).

For all embodiments, the temperature of the reactant gas stream in the catalytic region can be set to optimize the water gas shift reaction and maximize the production of hydrogen in the product gas stream. A temperature of about 375 degrees C., preferably at least 300 degrees centigrade, is likely to maximize the activity of, for example, a Pt/ZnO/alumina catalytic system. Catalyst temperatures below about 175 degrees C. are unlikely to adequately catalyze the water gas shift reaction.

The flow rate of the reactant gas stream in the catalytic region can be set to optimize the water gas shift reaction and maximize the production of hydrogen in the product gas stream. The optimal flow rate can be adjusted depending upon the concentration of CO in the reactant gas stream and on the physical form of the catalyst. Other factors may also influence the optimal flow rate include, for example, the concentration of steam, pressure, temperature, activity and loading of the catalyst.

Reaction zone pressures can be used such as from atmospheric up to about 500 psig can be used in the invention.

In one embodiment of the invention the composition of the input gas stream includes: (i) between about 1% by volume and about 10% by volume CO, (ii) at least 30% by volume hydrogen, and (iii) at least 15% by volume $H_2O$. The input gas stream is characterized by a flow rate greater than 500 $hr^{-1}$ particle VHSV for catalysts in particle form. The input gas stream is characterized by a flow rate greater than 2,000 $hr^{-1}$ monolith VHSV when the catalyst is in the form of a washcoat composition deposited on a monolith. The methane production suppressing water gas shift reaction catalyst used in this particular embodiment may include either a catalyst containing platinum and a methane suppressing amount of ZnO on an aluminum support, or a catalyst containing platinum and ceria calculated as $CeO_2$ on a ZnO support.

As demonstrated in the figures described below, the methods of the invention reduce the production of methane that can accompany water gas shift reactions to levels typically below 0.1% v, preferably below 0.025% v and more preferably as low as methane detection limits of about 5 ppm.

FIG. 1 shows a graphical representation 100 of some embodiments of the invention. Specifically, the graph 100 illustrates that the methods of the invention significantly reduce the amount of methane produced by the water gas shift reaction. When catalytic activity is measured by percentage of CO converted in the water gas shift reaction, the catalysts and methods of the invention show a comparable catalytic activity to methane-producing conventional water gas shift reaction catalysts, but at increased temperatures, typically about 50 degrees C. increased temperatures. Specifically, the graph 100 shows that the methods of the invention significantly reduce the amount of methane produced by the water gas shift reaction in a gas stream containing high levels (for example, 5 to 10% by volume) of CO at low space velocities (for example, about 2,500 $hr^{-1}$ particle VHSV). In one embodiment of the invention, the methods of the invention as illustrated in FIG. 1, can be practiced with catalysts comprising an alumina support impregnated with a ZnO basic metal oxide and a Pt catalytic agent. In FIG. 1, the conversion percentage 110 of CO to $CO_2$ by the water gas shift reaction is: shown on the left ordinate (y-axis), temperature 120 is shown on the abscissa (x-axis), and methane production is shown on the right ordinate axis 130 in units of ppm. The results obtained from the methods of the present invention are exemplified by two sets of curves in FIG. 1: (i) to indicate percent conversion of CO to $CO_2$, a first curve 111 represents typical results obtained from water gas shift reactions performed by the methods of the invention while a second curve 112 represents results obtained from a methane-producing Pt/alumina WGS reaction catalyst, and (ii) to indicate the amount of methane produced in these water gas shift reactions, the amount of methane produced is represented by a third curve 131 for methods of the invention compared to a fourth curve 132 for a methane-producing Pt/alumina catalyst.

The first curve 111 is shifted about 50 degrees to higher temperatures for any given CO conversion percentage when compared to the second curve 112. Accordingly, for a given WGS reaction temperature above about 250 degrees C., the WGS reaction catalysts of the invention, as represented by the first curve 111, can have lower WGS. reaction catalytic activity as measured by percent CO conversion 110. However, the WGS reaction catalysts of the invention virtually eliminate the production of methane from the WGS reaction, as demonstrated by comparing the typical levels of methane production for methane-producing Pt/alumina catalysts, shown by the fourth curve 132, with the suppression of methane production in when the WGS reaction is catalyzed according to the methods of the invention, as shown by the third curve 131.

FIG. 2 shows a graphical representation 200 of some embodiments of the invention. Specifically, the graph 200 illustrates that the methods of the invention significantly reduce the amount of methane produced by the water gas shift reaction in a gas stream containing low levels (for example, below 1% by volume) of CO at higher space velocities (for example, above 10,000 $hr^{-1}$ particle VHSV). In one embodiment of the invention, the methods of the invention as illustrated in FIG. 2, can be practiced with catalysts comprising a ZnO support impregnated with ceria and a Pt catalytic agent. For comparison, a methane producing Pt/ceria WGS reaction catalyst is also illustrated. The catalysts and the methods of the invention meet a long-felt need in the art to significantly reduce the production of methane in the WGS reaction without significantly lowering catalytic activity. Methane production is typically a problem encountered with many WGS reaction catalysts, particularly at reaction temperatures above 300 degrees C. Methane production is also particularly problematic with precious metal catalysts.

In FIG. 2, the conversion percentage 210 of CO to $CO_2$ by the water gas shift reaction is shown on the left ordinate (y-axis), temperature 220 is shown on the abscissa (x-axis), and methane production is shown on the right ordinate axis 230 in units of ppm. The results obtained from the methods of the present invention are exemplified by a set of curves in FIG. 2: a first curve 211 which indicates percent conversion of CO to $CO_2$ by the water gas shift reaction practiced using the methods of the invention, (ii) a second curve 212 which indicates percent conversion of CO to $CO_2$ using the methane producing water gas shift reaction catalyst and (iii) a third curve 231 which indicates the amount of methane produced in typical water gas shift reactions practiced according to methods of the invention, and (iv) a fourth curve 232 which indicates the amount of methane produced in typical water gas shift reactions practiced using the methane producing catalyst. Clearly, the methods and WGS reaction catalysts of the invention, for example, as shown in curve 231, dramatically reduce the level of methane production concomitant to the WGS reaction as compared to using a typical methane producing $Pt/CeO_2$ WGS catalyst, as shown in curve 232. The reduction in methane production occurs without significant reduction of the WGS catalytic activity (as measured by percent CO conversion to $CO_2$) especially at temperatures above 300 degrees C.

The experiment depicted in FIG. 2 demonstrates the catalytic activity and methane production suppression of catalysts of the invention in gas streams having lower percentages of CO (0.5%), hydrogen (20%), and $H_2O$ (10%). Gas streams having higher percentages of these components can be used with the methods of the invention. Higher percentages of CO, hydrogen, and $H_2O$ are, in fact, preferred for use in, for example, fuel cell applications.

Preferably, the WGS reaction is carried out in a continuous mode with the reactants being passed over the WGS reaction catalyst of the invention. In one embodiment the the WGS reaction catalyst is in the form of a plurality of beads, for example, a plurality of catalyst beads contained in one or more reaction zones. In another embodiment the reaction catalyst can be in the form of a washcoat composition deposited on a monolith.

In the first embodiment, the catalysts of the invention can be produced in the form of durable beads, for example, by using alumina beads as a support. The size of the beads typically affects the pressure drop across catalytic regions, with larger beads leading to a lower pressure drop while potentially limiting the gas stream conversion by the rate of gas diffusion, while smaller catalytic beads can create larger backpressure thereby potentially limiting the flow of a gas stream by increasing the pressure drop across the catalytic region. Any appropriate method of packing or preparing the catalysts of the invention can be selected by one skilled in the art to prepare a catalytic system to practice the invention. Other operating parameters, as recognized in the art, are of course also possible and even desirable for certain applications.

The catalyst system can be used in various types of process configurations. FIG. 3 illustrates one preferred embodiment wherein catalysts of the invention are configured as upstream catalysts in a gas process stream for the generation of hydrogen from the process stream. FIG. 3 shows a schematic diagram of a system 300 for generating hydrogen from a reactant 310 gas stream, while minimizing methane production. The system comprises a first catalytic region 320 and a product 330 gas stream. The reactant 310 gas stream flows through the first catalytic region 320, where it flows through a first catalyst 321. In some embodiments, two or more systems 300 for generating hydrogen from a reactant 310 gas stream, while minimizing methane production, can be linked in series.

In another preferred embodiment, the reactant gas is passed over the catalyst that is in the form of washcoat composition deposited on a monolith. FIG. 4 depicts a graphical illustration 400 of one example of this particular embodiment. As was. depicted in earlier figures, the methods of the invention significantly reduce the amount of methane produced as a side reaction water gas shift reaction. In FIG. 4 the gas stream concentration contains high levels (for example, about 10% by volume) of CO. In this example, the catalyst is prepared using a washcoat composition containing 5% Pt as the catalytic agent and alumina as the support deposited on a monolith. In one catalyst of the invention the catalyst contains 1 wt. % ZnO as the basic metal oxide. In a second catalyst of the invention the catalyst contains 5 wt. % ZnO as the basic metal oxide. A third Pt/alumina catalyst used for comparison in the example does not contain any basic metal oxide. In FIG. 4 the conversion percentage 410 of CO by the water gas shift reaction is shown on the left ordinate axis, the temperature 420 is shown on the abcissa (x-axis), and methane production is shown on the right ordinate axis 430 in ppm. The results obtained by methods of the present invention are illustrated by two sets of curves in FIG. 4: (i) curves to indicate the percent conversion of CO to $CO_2$, and (ii) curves to indicate the amount of methane produced accompanying the WGS reaction. The first set of curves 411, 412, and 413 indicate the conversion of the CO to $CO_2$ for the 1% ZnO-containing washcoat composition, the 5% ZnO-containing washcoat composition, and the washcoat composition without any basic metal oxide, respectively. Increasing amounts of the basic metal oxide lower the conversion of CO to $CO_2$ slightly. However, the WGS reaction catalysts of the invention virtually eliminate the production of methane, as demonstrated by comparing the typical levels of methane production for the catalysts of the invention in curves 414 (for the 1% ZnO-containing composition) and 415 (for the 5% ZnO-containing composition) with the methane-producing Pt/alumina catalyst, shown by the curve 416 (for the composition without ZnO).

The following examples further illustrate the present invention, but of course, should not be construed as in any way limiting its scope.

EXAMPLE 1

Preparation of Methane Suppressing Water Gas Shift Catalysts

A methane suppressing water gas shift reaction catalyst was prepared in two ways: (1) by using ZnO pellets as the support material for the preparation of a precious metal/$CeO_2$/water gas shift reaction catalyst using a bulk ZnO extrudate material; and (2) by impregnating a pre-formed Pt/alumina catalyst (ESCAT 29, 0.5% Pt/$Al_2O_3$) with Zn-nitrate solution followed by drying and calcination to decompose the Zn-nitrate to Zn-oxide (using ZnO as an inhibitor in small concentration).

To prepare the (0.5% wt.)Pt/(5% wt.)ZnO/$Al_2O_3$ catalyst, about 5% by weight of ZnO was impregnated into alumina support by incipient wetness with 1M Zn($NO_3$)$_2$ solution followed by drying and calcination at 500 degrees C. The catalyst was in the form of ⅛ inch spheres.

To prepare the Pt/$CeO_2$/ZnO catalyst, a zinc oxide extrudate impregnated with Ce($NO_3$)$_3$ followed by calcination and a second subsequent impregnation with 0.5% Pt (using Pt amine).

EXAMPLE 2

CO Conversion Activity and Methane Production of ZnO Containing WGS Catalytic Systems at High Input CO Concentrations The experimental data for Table 1 which is illustrated in FIG. 1, was collected using a quartz-tube reactor (1 inch diameter) and granular samples (⅛ inch) at 10 g of sample per tube. Activity is expressed as the temperature needed to reach 50% conversion (i.e., T(50)). The lower the temperature (the higher the data point), the better the activity of the WGS reaction catalyst. FIG. 1 shows the WGS activity (in line 111) of the (0.5% wt.)Pt/(5% wt.)ZnO/alumina (ESCAT26) methane suppressing water gas shift reaction catalyst and its methanation activity (open squares, line 131). Methanation is not observed at reaction temperature up to about 450 degrees C. under the test conditions. Steam ($H_2O$) was added to a gas reactant stream of 8% v CO, 10% v $CO_2$, 43% v $H_2$ until the stream contained 25% v $H_2O$. The space velocity of the gas reactant stream was 2,500 $hr^{-1}$ VHSV. The gas reactant stream was passed through a ZnO/Pt/alumina catalyst of Example 1 and the conversion of CO to $CO_2$ and methane content were measured in the product gas stream. The CO conversion was measured by using a CO analyzer (California Analytical Instruments CRF) and the methane content was measured using a flame ionization detector (Rosmont 440A hydrocarbon analyzer).

Table 1

TABLE 1

| temperature | ppm $CH_4$ | % CO conversion |
| --- | --- | --- |
| 100 | 0.00 | 0.00 |
| 162.6 | 0.69 | 0.49 |
| 181.4 | 3.98 | −0.88 |
| 198 | 5.94 | 0.13% |
| 205.4 | 7.41 | −0.34 |
| 211.4 | 9.08 | 0.35 |
| 218.7 | 10.26 | 0.36 |
| 226.4 | 12.66 | 0.02 |
| 235.2 | 13.84 | 0.24 |
| 244.6 | 14.28 | 0.62 |
| 256.7 | 15.66 | 0.94 |

TABLE 1-continued

| temperature | ppm CH$_4$ | % CO conversion |
|---|---|---|
| 268.1 | 16.25 | 1.17 |
| 276.8 | 16.83 | 1.07 |
| 285.2 | 17.28 | 2.52 |
| 293.7 | 17.91 | 3.27 |
| 303.1 | 17.91 | 4.15 |
| 314.8 | 19.39 | 5.16 |
| 326.1 | 19.24 | 8.07 |
| 335.4 | 19.68 | 12.02 |
| 344.9 | 20.47 | 16.63 |
| 354.7 | 20.47 | 19.63 |
| 365.9 | 20.91 | 27.97 |
| 375.9 | 21.06 | 36.25 |
| 386.4 | 21.64 | 44.98 |
| 395.9 | 21.50 | 56.27 |
| 406.2 | 21.79 | 63.73 |
| 415.2 | 21.79 | 66.80 |
| 424.8 | 21.79 | 74.72 |
| 436.6 | 21.35 | 72.69 |
| 447.9 | 20.76 | 73.58 |

EXAMPLE 3

Comparative Example of CO Conversion Activity and Methane Production of Conventional WGS Catalytic Systems at High Input CO Concentrations Table 2 and FIG. 1 shows the WGS activity of commercial 0.5% wt Pt/alumina (ESCAT26) (in line 112) and its methanation activity (open squares, line 132). Methanation reaches approximately 4,000 ppm as the reaction temperature rises from about 300 and 450 degrees C. under the test conditions (see above). The CO conversion was measured by using a CO analyzer (California Analytical Instruments CRF) and the methane content was measured using a flame ionization detector (Rosmont 440A hydrocarbon analyzer).

TABLE 2

| temperature | ppm CH$_4$ | % CO conversion |
|---|---|---|
| 100 | 0.00 | 0.00 |
| 112.7 | 1.99 | 0.45 |
| 136.2 | 2.14 | −1.49 |
| 151.5 | 2.14 | −.14 |
| 161.3 | 2.43 | 0.52 |
| 167.2 | 2.58 | 1.20 |
| 173 | 3.21 | 1.22 |
| 180.9 | 3.79 | 0.84 |
| 190 | 3.94 | 0.86 |
| 199.2 | 4.81 | 1.11 |
| 209.7 | 4.23 | 1.81 |
| 221 | 4.52 | 1.77 |
| 230.1 | 4.23 | 1.61 |
| 240.8 | 3.21 | 1.53 |
| 251 | 2.58 | 2.55 |
| 260.7 | 1.56 | 3.65 |
| 270.1 | 1.70 | 4.53 |
| 280 | 1.41 | 6.02 |
| 290.5 | 0.10 | 6.75 |
| 300.3 | 2.58 | 9.02 |
| 310.4 | 6.91 | 12.05 |
| 320.2 | 13.13 | 17.12 |
| 330.8 | 25.92 | 21.41 |
| 342.1 | 44.30 | 31.40 |
| 351.3 | 86.91 | 37.72 |
| 360.8 | 139.57 | 45.85 |
| 370.2 | 229.40 | 54.31 |
| 379.6 | 338.19 | 66.55 |
| 390.2 | 550.71 | 73.87 |
| 399.2 | 836.72 | 72.49 |
| 408.9 | 1186.67 | 75.80 |

TABLE 2-continued

| temperature | ppm CH$_4$ | % CO conversion |
|---|---|---|
| 418.1 | 1716.38 | 76.67 |
| 428.3 | 2181.64 | 80.10 |
| 437.6 | 2795.19 | 78.82 |

EXAMPLE 4

CO Conversion Activity and Methane Production of ZnO Containing WGS Catalytic Systems and for Other WGS Catalytic Systems at Low Input CO Concentrations FIG. 2 shows the WGS activity (in line 211) of a Pt/CeO$_2$/ZnO methane production suppressing water gas shift reaction catalyst of Example 1 and of a 0.6% Pt/CeO$_2$ water gas shift reaction catalyst (in line 212) and their methanation activities (in lines 231 and 232, respectively). Steam (H$_2$O) was added to a gas reactant stream of 0.5% v CO, 20% v H$_2$ until the stream contained 10% v H$_2$O. The flow rate of the gas reactant stream was 24,000 hr$^{-1}$ WSV. The gas reactant stream was passed through the catalyst compositions and the conversion of CO to CO$_2$ and methane content were measured in the product gas stream. The CO conversion was measured by using a CO analyzer (California Analytical Instruments CRF) and the methane content was measured using a flame ionization detector (Rosmont 440A hydrocarbon analyzer). As shown by line 231, the amount of methanation remained well below 025% v to reaction temperatures of about 400 degrees C. for the Pt/CeO$_2$/ZnO catalyst of Example 1. Conversely, for the process using the 0.6% Pt/CeO$_2$ catalyst, the amount of methanation rose from less than 10 ppm at about 280 degrees C. to about 100 ppm above 340 degrees C. The CO conversion using the catalyst of Example 1 rose to between 50 and 75% v at temperatures above about 300 degrees C. The CO conversion using the 0.6% Pt/CeO$_2$ catalyst, rose to between 90 and 100% at temperatures above about 300 degrees C.

TABLE 3

CO Conversion and Methane Production for the Pt/CeO$_2$/ZnO Catalyst of Example 1

| temperature (° C.) | Xco, % | methane, ppm |
|---|---|---|
| 200 | 4.4 | 0 |
| 250 | 21.1 | 0 |
| 300 | 50.3 | 0 |
| 350 | 64.4 | 0 |
| 400 | 69.1 | 0 |

TABLE 4

CO Conversion and Methane Production for the 0.6% Pt/CeO$_2$ Catalyst

| temperature (° C.) | Xco % | methane, ppm |
|---|---|---|
| 180 | | |
| 200 | 8.7 | 0 |
| 250 | 74.9 | 0 |
| 300 | 97.1 | 13 |
| 350 | 96.2 | 104 |

EXAMPLE 5

Preparation of Methane Suppressing Water Gas Shift Catalysts Washcoat Composition and Monolith Formation A. Preparation of Pt/Alumina (+ZnO) Catalyst
1. Impregnate Alumina (SBA150) with 5% Pt (using 18.5 wt. % Pt amine solution (incipient wetness impregnation)
2. Dry in drying oven set at 120° C. for 8 hours or overnight; calcine for 4 h at 500° C.
3. Impregnate the resulting Pt/alumina to incipient wetness with Zinc Nitrate for a final loading of 1% or 5% ZnO.
4. Dry at 120° C. for 8 hours or overnight; Calcine at 500° C. for 4 hours.

B. Preparation of Pt/Alumina (+ZnO) Slurry
1. Empty catalyst powder into a mini ball mill (0.2 liter) and add DI water to IWP.
2. Mill until PSD<10 microns Coating of Monoliths
1. Using dry weight gain calculations, coat samples by dipping in above slurry.
2. Blow Sample with air knife to clear channels
3. Dry coated samples in drying oven at 120° C. for 8 hours or overnight
4. Calcine samples in calcining oven at 500° C. for 4 hours.
5. Calculate and record dry gain.

EXAMPLE 6

CO Conversion Activity and Methane Production of 5% Pt/alumina Washcoated Monolith WGS Catalytic Systems Catalyst testing in 1" reactor tubes:

The washcoated monolith (0.75" diameter×0.75" length is wrapped with ceramic cloth and placed in a 1" quartz tube of 24" length. A thermocouple on the top end of the monolith measures the inlet temperature of the gas.

The catalyst activity is measured by recording the CO, $CO_2$ and hydrocarbon outlet concentrations (CAI ZRF analyzer for $CO/CO_2$, Rosemont model 400A hydrocarbon analyzer) in dependence on the inlet temperature at a given feed gas composition. (as indicated in the figure). Conversion %=100* (CO feed−CO out)/(CO feed). The results are illustrated in FIG. 3.

What is claimed:

1. A process for carrying out the water gas shift reaction comprising employing a methane production suppressing water gas shift reaction catalyst, wherein the methane production suppressing water gas shift reaction catalyst comprises a catalytic agent comprising at least one member selected from the group consisting of Rh, Pd and Pt; and a methane production suppressing effective amount of zinc oxide.

2. The process of claim 1, wherein the methane production suppressing water gas shift reaction catalyst comprises a support.

3. The process of claim 2, wherein the support comprises activated alumina.

4. The process of claim 2, wherein the support comprises zinc oxide.

5. The process of claim 2, wherein the support has a BET surface area of at least 10 $m^2/g$.

6. The process of claim 2, wherein the methane production suppressing water gas shift reaction catalyst further comprises a promoter.

7. The process of claim 6, wherein the promoter comprises at least one member selected from the group consisting of $CeO_2$, $Nd_2O_3$, $Pr_2O_3$, $TiO_2$, $Fe_2O_3$, NiO, $MnO_2$, and $Co_2O_3$.

8. The process of claim 7, wherein the promoter is ceria calculated as $CeO_2$.

9. The process of claim 2, further comprising a monolith, wherein the methane production suppressing water gas shift reaction catalyst is deposited on the monolith as a washcoat composition.

10. The process of claim 9, wherein the catalytic agent is Pt.

11. The process of claim 9, wherein the support is alumina.

12. The process of claim 1, wherein the catalytic agent is Pt and the support is alumina.

13. The process of claim 1, wherein the process further comprises the steps of:
   providing an input gas stream;
   contacting the input gas stream with the methane production suppressing water gas shift reaction catalyst; and
   catalyzing the water gas shift reaction with the methane production suppressing water gas shift reaction catalyst.

14. The process of claim 13, wherein the methane production suppressing water gas shift reaction catalyst comprises: (i) alumina support particles; (ii) zinc oxide calculated as ZnO; (iii) Pt;
   wherein the input gas stream includes: (i) between about 1% by volume and about 10% by volume CO; (ii) at least 30% by volume hydrogen; and (iii) at least 15% by volume $H_2O$; and wherein the input gas stream is characterized by a space velocity greater than 500 $hr^{-1}$ particle VHSV.

15. The process of claim 13, wherein the methane production suppressing water gas shift reaction catalyst comprises: (i) zinc oxide support particles calculated as ZnO; (ii) ceria calculated as $CeO_2$; (iii) Pt;
   wherein the input gas stream includes: (i) between about 1% by volume and about 10% by volume CO; (ii) at least 30% by volume hydrogen; and (iii) at least 15% by volume $H_2O$; and wherein the input gas steam is characterized by a space velocity greater than about 500 $hr^{-1}$ particle VHSV.

16. The process of claim 13, wherein the methane production suppressing water gas shift reaction catalyst comprises: (i) an alumina support; (ii) zinc oxide calculated as ZnO; (iii) Pt;
   wherein the methane production suppressing water gas shift catalyst is in the form of a washcoat composition deposited on a monolith.

* * * * *